United States Patent
Turock

(10) Patent No.: US 6,243,373 B1
(45) Date of Patent: Jun. 5, 2001

(54) METHOD AND APPARATUS FOR IMPLEMENTING A COMPUTER NETWORK/INTERNET TELEPHONE SYSTEM

(75) Inventor: David L. Turock, Westfield, NJ (US)

(73) Assignee: Telecom Internet Ltd., Gerrard's Crossing (GB)

( * ) Notice: Subject to any disclaimer, the term of this patent is extended or adjusted under 35 U.S.C. 154(b) by 0 days.

(21) Appl. No.: 08/548,323

(22) Filed: Nov. 1, 1995

(51) Int. Cl.[7] ............... H04L 12/66; H04L 12/28; H04M 1/64
(52) U.S. Cl. ............... 370/352; 370/401; 379/88.17
(58) Field of Search ............... 379/220, 221, 379/207, 112, 113, 114, 88, 67, 100.15, 100, 90.01, 93.09, 93.01; 370/351, 450, 389, 392, 352, 485, 458, 404, 401, 394, 747; 395/200.01, 200.02, 200.03

(56) References Cited

U.S. PATENT DOCUMENTS

| | | | |
|---|---|---|---|
| 4,630,262 | * 12/1986 | Callens | 370/474 |
| 4,771,425 | * 9/1988 | Baran et al. | 370/458 |
| 4,866,704 | * 9/1989 | Bergman | 370/452 |
| 5,115,431 | * 5/1992 | Williams | 370/394 |
| 5,483,589 | * 1/1996 | Ishida et al. | 379/220 |
| 5,526,353 | * 6/1996 | Henley et al. | 370/392 |
| 5,594,784 | * 1/1997 | Velius | 379/88 |
| 5,608,786 | * 3/1997 | Gordon | 379/100 |
| 5,726,984 | * 3/1998 | Kubler et al. | 370/348 |
| 5,764,741 | * 6/1998 | Barak | 379/114 |

OTHER PUBLICATIONS

Yang, C., "RFC 1789: INETPhone–Telephone Services and Servers on Internet." Apr. 1995. <http://ds.internic.net/rfc/rfc1789.txt>(Feb. 12, 1997).*

Cerf, V., et al. "A Protocol for Packet Network Intercommunication." IEEE Transactions on Communications, vol. COM–22. No. 5, May 1974.*

(List continued on next page.)

Primary Examiner—Wellington Chin
Assistant Examiner—Steven Nguyen
(74) Attorney, Agent, or Firm—Darby & Darby

(57) ABSTRACT

A method and apparatus are provided for communicating audio information over a computer network. A standard telephone connected to the public switched telephone network (PSTN) may be used to communicate with any other PSTN-connected telephone, where a computer network, such as the Internet, is the transmission facility instead of conventional telephone transmission facilities, such as the interexchange or intralata facilities. In addition to telephone-telephone communication, telephone-computer and computer-telephone communication is also possible. The originator of a conversation (calling party) dials the number of an access port for the computer network. The call is routed to a central office switching system which is connected to the PSTN and then to the access port which is a specialized computer system (ITS node). The caller transmits the number of the desired party (the called party) to the specialized computer system (ITS node) which interfaces between the telephone switching system and the computer network. The specialized computer system (ITS node) receives the number of the called party and establishes a two-way, fill duplex communications link via the computer network to a corresponding remote access port or specialized computer system (ITS node) in the vicinity of the called party. This specialized computer system (ITS node) at the receiving end is connected to the local PSTN in the region of the called party, and uses the local PSTN to connect the call to the called party. Once the call is answered at the called party, the calling and called party may communicate as if the call had been established using the conventional telephone system.

24 Claims, 10 Drawing Sheets

OTHER PUBLICATIONS

Weinstein, C., et al. "Experience with Speech Communication in Packet Networks." IEEE Journal on Selected Areas in Communications, vol. SAC–1, No. 6, Dec. 1983.*

Baran, P., "On Distributed Communications Networks." IEEE Transactions on Communications Systems, manuscript received Oct. 1963, Mar. 1964.*

Aras. C., et al. "Real–Time Communication in Packet–Switched Networks." Proceedings of the IEEE, vol. 82, No. 1, Jan. 1994.*

"Dialing without dollars" by Fred Hapgood, Inc. vol. 17, No. 4, p. 8, Journal code : INO, Jul. 1995.*

"Internet phone calls are cheap but limited", New Media Markets, Newsletter, Feb. 23, 1995.*

"Internet's international phone calls are cheap but limited", Telecom markets, Newsletter, Mar. 2, 1995.*

"Internet phone saves 50% on long distance", 411 Newsletter, vol. 17, No. 15, Aug. 5, 1996.*

"Internet access: Internet phone–to–phone technology now a reality . . . ", EDGE publishing, Aug. 12, 1996.*

"Internet telephony seems to be evolving fast . . . ", Computergram International, No. 2980, Aug. 19, 1996.*

"Competition heats up in Internet phone call wars", Newsbytes News network, Jun. 2, 1995.*

"VocalTec Telephony Gateway", posted on the Internet, viewd on Jan. 15, 1997.*

"Netspeak corporation introduces WebPhone, . . . ", Internet, Mar. 18, 1996.*

"Phone Service Via the Internet May Slash Rates", The Washington Post, by Mike Mills, p. A4, Aug. 11, 1996.*

Clifford et al, Experience with Speech Communication in Packet Networks, IEEE, p. 963–978, 1983.*

Yang, INETPhone, RFC, pp. 1–6, Apr. 1995.*

WO9620553, Gordon, Unified message and Long distance communication system, Apr. 7, 1996.*

* cited by examiner

METHOD AND APPARATUS FOR IMPLEMENTING A COMPUTER NETWORK/INTERNET TELEPHONE SYSTEM

FIELD OF THE INVENTION

The present invention generally relates to the field of telecommunications. More specifically, the present invention concerns a method and apparatus for transmitting telephone calls to or from a standard telephone set using a computer network such as the Internet.

BACKGROUND OF THE INVENTION

Communication systems for transmitting telephone calls have become an integral, indispensable part of everyday life. The first roots of telephony were planted in 1876 with the invention of the first practical telephone by Alexander Graham Bell. As the number of calling stations or customer lines (telephones) in the system began to grow, the wiring system interconnecting the telephones became extremely complicated and unwieldy. One solution to this problem was the introduction of switching systems. Each customer line terminated in a local switching system commonly referred to as a central office (CO). The central office then performed the task of connecting each of the telephone lines it served to a corresponding telephone line in order to complete a call. If the two parties to a call were serviced by the same central office, then the connection could be completed by the same central office without having to resort to other portions of the telecommunications network. If the call required connection to a telephone line serviced by a distant central office, then a connection between the central offices was carried out using a trunk, i.e., a connection between two central offices.

As the number of central offices increased, higher level switching was required to perform the interconnections between central offices. Essentially, each central office was treated as a line to a higher level switching system for switching traffic between the central offices. In this manner, a call from a first subscriber at one location to a second subscriber at a distant location is routed from the first subscriber to the central office servicing the first subscriber. The call is then routed from the first subscriber's central office to a higher level switching office and on to the second subscriber's central office. From the second subscriber's central office, the call is finally routed to the second subscriber.

Each switching system or central office includes equipment for providing signalling, control and switching functions. The signalling equipment monitors the activity of the various lines connected to the central office and forwards control information associated with each line to the control equipment. The control equipment receives the control information and establishes the appropriate connections by way of the switching equipment. The switching equipment is functionally a crosspoint matrix for completing connections between selected input lines and selected output lines. Prior to the introduction of digital switching systems, a number of crossbar switches were used to implement the crosspoint matrix. More recently, digital switching systems, such as the AT&T 5ESS, have been used in place of mechanical or electromechanical switching systems. The essentials of digital telephone switching systems, as well as digital telephony in general, are described in John Bellamy, *Digital Telephony* (John Wiley & Sons 1991), the contents of which are incorporated herein by reference.

Recently, the volume of telephone traffic between central offices has been growing more rapidly than local telephone traffic. As a result, so called "T-carriers" have evolved as a cost efficient method of transmission between central offices. T-carriers, such as T1, T1C, T1D, T2, T3 and T4, are all digital carriers which require the conversion of analog telephone signals into digital format before they are transmitted over the carrier to the remote end. The most common type of T-carrier is the T1, and as such will be used in the present specification. At the remote end, the digital signals are converted back into analog format and routed through the telephone system. The transmission of digital signals over the T1 carrier may be accomplished using time division multiplexing (TDM) wherein a high bandwidth communications link, such as a 1.544 Mbit/S T1 carrier, is divided into a number of lower bandwidth communication channels, such as 64 Kbit/S channels. Each 64 Kbit channel is assigned a time slot of the T1 carrier. In this way, the high bandwidth T1 carrier is periodically available for a restricted portion of time, enough for each channel to transmit at an effective rate of 64 Kbit/S.

Telephone customers are charged for their usage of the telephone network, with such charges typically being proportional to the amount of time used and the distance from the calling party to the called party. Thus, calls placed over long distances will usually cost more than calls placed over shorter distances. Additionally, local calls which do not involve higher level switching or routing within the system are oftentimes charged at a flat rate independent of the actual customer usage. To a lesser extent, flat rate charges may be established for long distance calls. This may be accomplished by way of a "leased line" wherein the customer leases a dedicated communications link from one location to another. For a fixed fee, the customer is able to place calls between the two locations. The number of calls the customer is able to place is then limited by the bandwidth of the leased line or communications link.

Another type of flat rate service is Wide Area Telephone Service (WATS) wherein a customer selects a certain geographic area for either receiving or transmitting calls. A flat rate is charged for this type of telephone service, depending on the size of the selected area and whether full time WATS service or measured time WATS service, i.e., a certain number of hours per month, is selected.

For the average customer, WATS service or leased line service is economically impractical, since such services are only cost effective for high volume users such as corporations and other institutions. Thus, the average customer is relegated to paying for telephone service on a per minute or per usage basis and is not able to enjoy the benefits of flat rate telephone usage.

An alternative to telephone communication is data communication using computer technology. One way of data communication between computers is by way of modem. Specifically, a modem is used to transmit information or data from one computer to another computer similarly equipped with a modem. However, the transmission medium for modem communication is again the telephone network. Thus, there is effectively no real economic benefit. More recently, as the number of computers in use has increased, computer networks have been used to interconnect large numbers of computers in order to provide data communication. Although access to the computer networks is by way of the telephone system, the access point to the computer network for most users is often a local call which is usually charged at a flat rate. The interconnection and routing of data once it has reached the computer network is typically by way of lower cost lines, such as leased lines, since there is now sufficient traffic to justify the cost associated with a leased line.

The Internet computer network in use today had its beginnings more than twenty years ago as a government project. Originally, the computer network was referred to as ARPANET (Advanced Research Projects Agency Network) and was constructed by identifying a small group of locations or cites across the United States that would function as network hubs. Each hub was directly connected to each other hub over a dedicated leased line running at 56 Kbps. In this way, all the sites were connected to each other by way of high speed carriers and locally connected using the local telephone network to other terminal sites not having a direct connection to any other site. The resulting configuration was in effect, a national computer network.

As the network expanded, there was a significant increase in the number of additional terminal sites locally connected to a network site, which site was itself interconnected to other sites. The number of major hubs remained relatively constant while the terminal sites connected to them began to function as intermediate satellites for providing network access to other sites. In effect, a "tree" type network evolved. Moreover, connections to countries other than the United States were established, thereby creating an international or world wide network. As the size of the network increased, the amount of data traffic also increased. This increase in traffic was the impetus for an increase in the bandwidth or capacity of the communications medium interconnecting the various hubs of the network. Today, in order to accommodate the increased traffic, fiber optic links are the primary communications link for most, if not all, of the interconnections among the network hubs. Satellite locations interface to the hubs primarily via fiber optic or T1 telephone link. Similarly, end users connected to the satellite locations are connected by way of modems or T1 lines. Currently, network control and operation is primarily administered by private or commercial organizations, as opposed to direct government involvement.

FIG. 1 illustrates a typical segment 100 of the Internet network topology. Each individual connection to the Internet is made through a router (not shown), such as part no. Cisco 4000 available from Cisco of Menlo Park, Calif. or part no. 8230 available from NewBridge of Herndon, Va. The router insulates local area networks (LAN) at specific sites from the numerous data packets being sent across the Internet which are of no interest to the particular LAN. For example, if a connection is established over the Internet from LAN 110 to LAN 120, any information exchanged between LAN 110 and LAN 120 is probably of no interest to LAN 130. The router thus prevents such information from reaching LAN 130. Conversely, if LAN 120 desires to transmit information to LAN 130, the router is sufficiently intelligent to allow this information to reach LAN 130 by way of the LAN 140 to which LAN 130 is connected.

The communications protocols used by computers on the Internet to communicate information include TCP (Transmission Control Protocol) and UDP (User Datagram Protocol). TCP is a connection-oriented protocol that provides a reliable data path between two communicating entities. In contrast, UDP is a connectionless protocol that does not guarantee delivery of messages. Although messages are typically delivered successfully in UDP, this may not be the case in the event of network failure or congestion. Both the TCP and UDP protocols are built on top of a lower layer protocol known as the IP (Internet Protocol). IP is used to format and route TCP and UDP messages. TCP/IP and UDP/IP have become worldwide de facto standards for interprocess communication and provide the underlying transport mechanism in use on the Internet. A detailed description of the principles and protocol of TCP/IP communication is set forth in Douglas E. Comer, *Internetworking with TCP/IP Volume 1 Principle Protocols and Architecture*, (Prentice Hall 1991).

Computer networks such as the Internet, which are capable of transmitting generic data or information between locations, have been used to transmit audio information between computers. At the transmitting computer, a person's voice may be digitized using an analog to digital (A/D) converter and transmitted to the receiving location where it is passed through a digital to analog (DIA) converter and presented as audio. This type of audio connectivity is arguably similar to flat rate telephony, in that audio information may be transmitted from one location to another by way of a high bandwidth, flat rate communications medium. However, this type of computer telephony system suffers from several major disadvantages. First, the system is limited to only those customers who have access to the Internet. While Internet access has now widely proliferated, it has not reached the near universal accessibility of POTS ("Plain Old Telephone Service") service. Such a system is utterly useless if it is desired to communicate with someone who does not have access to the Internet.

Second, such systems provide only half duplex communication, viz., that information can only be transmitted in one direction at any given point in time. There is no simultaneous, two way transfer of information. Third, user access to such a system is only by way of a computer, which is still significantly more expensive than a telephone. Fourth, user access is extremely inconvenient in comparison with corded, cordless, portable, mobile or cellular telephones, in that access may only be provided at a location where a computer is physically located. Fifth, communication with a particular individual may only be made by addressing the information to their computer network address, not to their standard telephone number.

While attempts have been made to remedy some of these deficiencies, the resulting systems are still inadequate. For example, the "Internet Phone" device available from VocalTec of Northvale, N.J., is a computer-based Windows device which provides full duplex audio connectivity across the Internet. However, the system is extremely cumbersome and impractical to use and also suffers from several disadvantages. Specifically, the Internet Phone does not use standard telephone numbers to address individuals; it requires a computer at both transmitting and receiving ends; and both transmitting and receiving locations must call in to establish a connection between the two parties. More importantly however, the system does not allow spontaneous communication since the communication sessions must be scheduled in advance. Each potential receiving end must state their time availability and specify a computer or machine location where they may be reached.

OBJECTS OF THE INVENTION

It is an object of the present invention to provide a method and apparatus capable of efficiently communicating audio information over a computer network.

It is an object of the present invention to provide a method and apparatus capable of efficiently communicating audio information over a computer network which is able to transmit the information at essentially a flat rate or charge.

It is an additional object of the present invention to provide a method and apparatus capable of communicating audio information over a computer network between users who do not have direct access to the computer network.

It is a further object of the present invention to provide a method and apparatus capable of communicating audio information over a computer network in full duplex format.

It is yet another object of the present invention to provide a method and apparatus capable of communicating audio information over a computer network without requiring the use of a computer at the user location.

It is an additional object of the present invention to provide a method and apparatus capable of communicating audio information over a computer network without requiring that the user be located at a computer location.

It is a further object of the present invention to provide a method and apparatus capable of communicating audio information over a computer network using standard user telephone numbers to direct the information transmitted.

SUMMARY OF THE INVENTION

According to the present invention, a novel method and apparatus are provided for communicating audio information over a computer network. The present invention allows anyone with a standard telephone connected to the public switched telephone network (PSTN) to communicate with any other telephone, using a computer network, such as the Internet, as the transmission facility in lieu of conventional telephone transmission facilities, such as the interexchange or intralata facilities.

In using an illustrative embodiment of the present, invention, the originator of a conversation (calling party) dials the number of an access port of the present system. The call is routed to a central office switching system which is connected to the PSTN. When the connection to the access port is established, a specialized computer system (ITS node) at the access port signals the user to transmit the number of the party that is to be called (the called party). The specialized computer system (ITS node) interfaces between the telephone switching system and a computer network, such as the Internet. The specialized computer system (ITS node) receives the number of the called party and establishes a two-way, full duplex communications link via the computer network to a corresponding specialized computer system (ITS node) at an access port in the vicinity of the called party. This specialized computer system (ITS node) at the receiving end is connected to the local PSTN in the region of the called party, and uses the local PSTN to connect the call to the called party. Once the call is answered at the called party, the calling and called party may communicate as if the call had been established using the conventional telephone system.

Since the access ports are connected over the computer network, even if the call is over long distances, the user would only have to pay for the local calls to the access ports, as well as the reduced or flat rate cost for use of the computer network.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of that embodiment, in which.

DETAILED DESCRIPTION OF THE PREFERRED EMBODIMENTS

Figure 1:
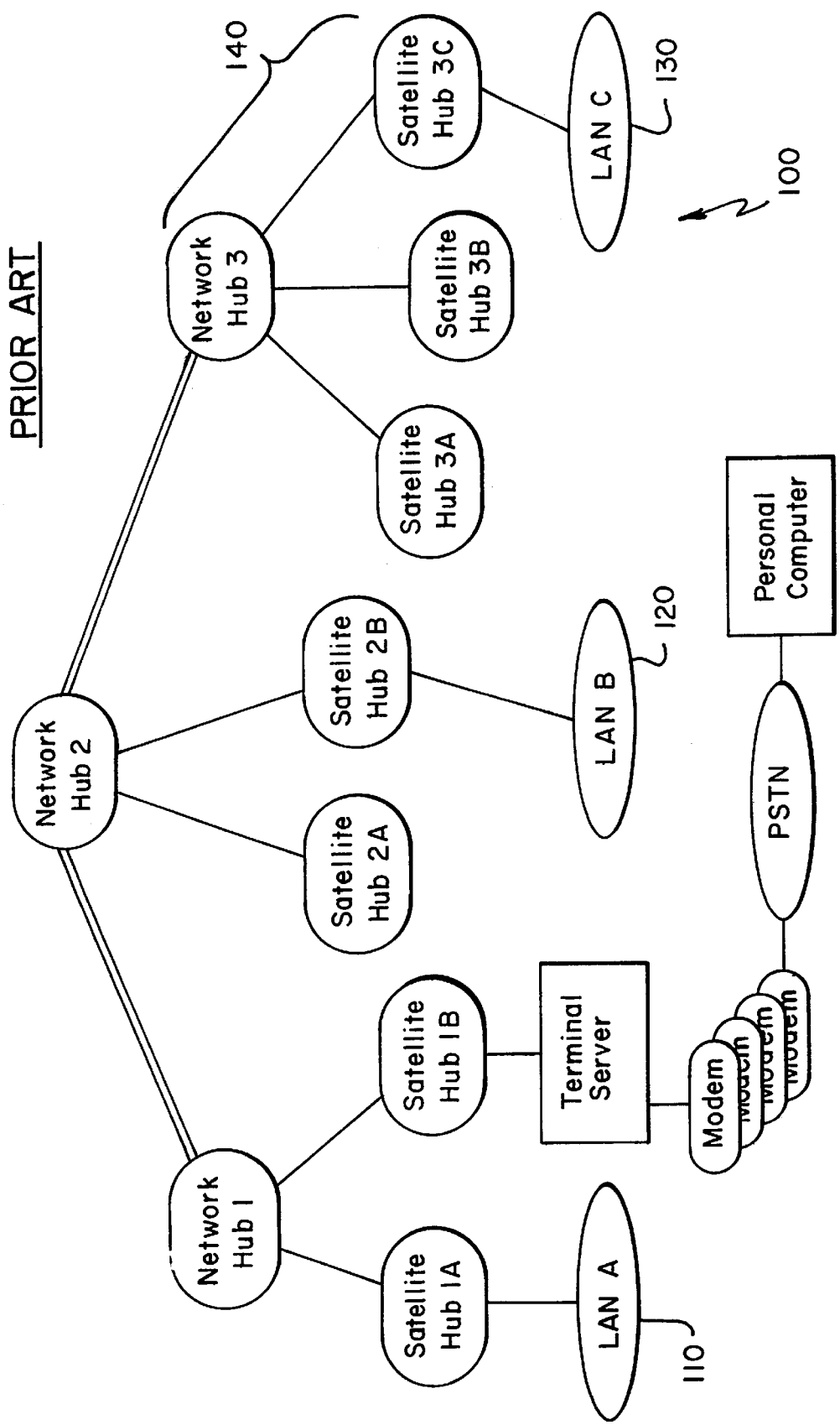
FIG. 1 is a block diagram of a prior art Internet computer network topology.
Figure 2:
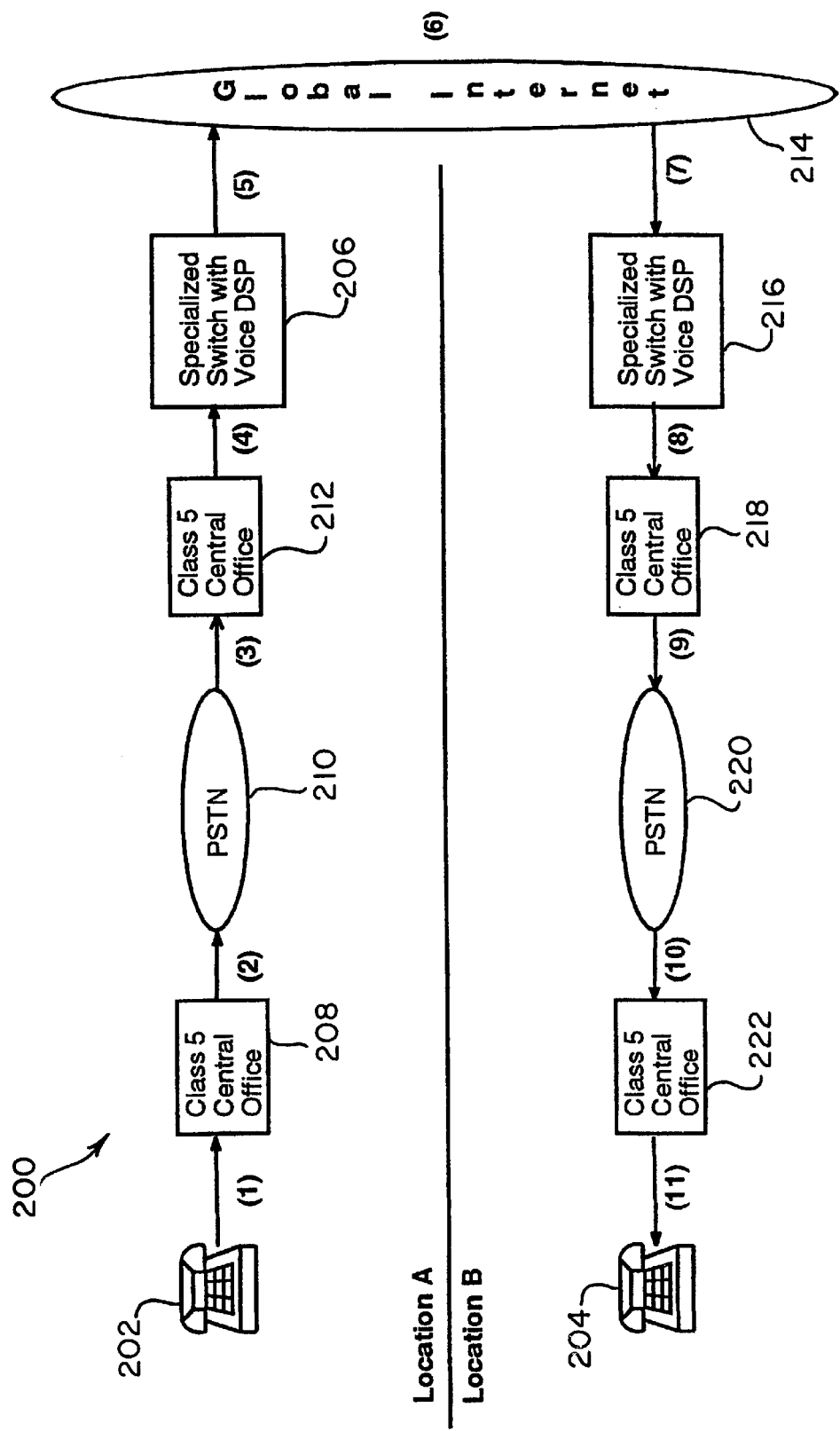
FIG. 2 is a block diagram of a computer network telephone transmission system according to the present invention illustrating telephone to telephone communication.

The overall operation of the present invention will first be described with reference to FIG. 2. FIG. 2 is a block diagram of a computer network telephone transmission system according to the present invention illustrating telephone to telephone communication. As shown in FIG. 2, computer network telephone transmission system 200 is used to provide telephone service between calling station 202 and called station 204. Initially, the user at the calling station dials the number of the specialized computer ITS node 206 at an Internet access port. The local switching office 208 routes the call through PSTN 210 to central office 212 which services specialized computer ITS node 206. At this point, a call has been established by way of PSTN 210 between the calling station 202 and the specialized computer ITS node 206.

Specialized computer ITS node 206 prompts the user at the calling station 202 to provide the telephone number of the desired or called aty 204. Based on the telephone number of the called party 204, specialized computer ITS node 206 provides a communication link to the called party 204. This is accomplished by the specialized computer ITS node 206 initiating a series of signalling messages over the Global Internet 214 using the TCP/IP protocol. While the specific embodiment of the present invention shown in FIG. 2 and discussed herein is described as using the Internet, it should be understood that the present invention may be used with any computer network in general. Additionally, specialized computer ITS node 206 can use either TCP/IP or UDP/IP to communicate voice data over the Internet. An advantage to using UDP/IP is that this protocol requires less transmission overhead resulting in faster data transmission. Due to the real-time nature of a telephone call, it is not worthwhile to attempt to redeliver messages initially returned as undeliverable. This is because subsequent messages continually flow and need to be delivered in order to maintain the real-time aspect and flow of the call. It is practically of no use to deliver message portions shifted in time.

The signalling messages are carried by the Internet 214 and delivered to a terminating specialized computer ITS node 216 at a remote access port. Terminating specialized computer ITS node 216 is identical to specialized computer 206, also referred to as the originating specialized computer ITS node, except that the originating specialized computer ITS node 206 is used to transmit a call, while the terminating specialized computer ITS node 216 is used to receive a call. Both originating and terminating specialized computers ITS node 206 and 216, respectively, are equipped with transmission circuits and receiving circuits and are capable of handling calls in either direction.

Terminating specialized computer ITS node 216 outdials a call through central office 218 to which it is connected. Central office 218 in turn, routes the call through PSTN 220 to central office 222 which services the called party 204. The telephone at the called party 204 is rung by central office 222 and a communications link between calling party 202 and called party 204 is established.

Figure 3:
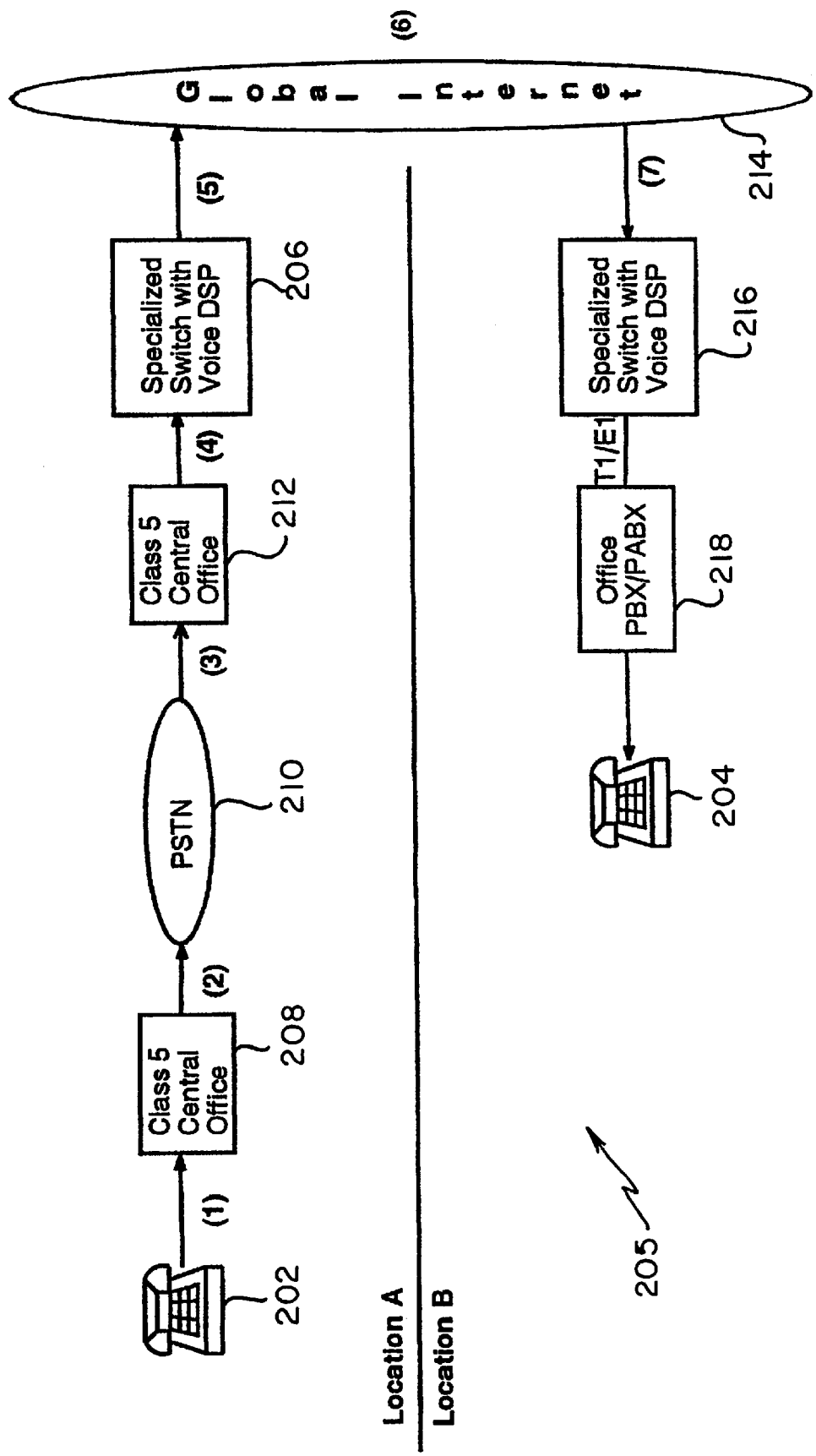
FIG. 3 is a block diagram of an alternative embodiment of the computer network telephone transmission system according to the present invention illustrating telephone to telephone communication.

In an alternative embodiment according to the present invention shown as 250 in FIG. 3, the need for dialing the telephone' number of the specialized switch and then transmitting the telephone number of the called party 204 may be eliminated, by combining this operation into one step. Essentially, in this embodiment, specialized computer ITS node 216 connects directly to a central office or a private branch exchange (PBX) 218. In this situation, if the calling party is located at 204, which is directly connected to specialized computer ITS node by way of PBX 218, then the calling party at 204 need only dial the telephone number of the called party located at 202, since all calls originating from the central office or PBX 218 are routed directly to specialized computer ITS node 216. There is no need to access specialized computer ITS node 216 by way of a PSTN. Of course, calls placed at location 202 must still first dial the telephone number of specialized switch 206, as described above.

Figure 4:
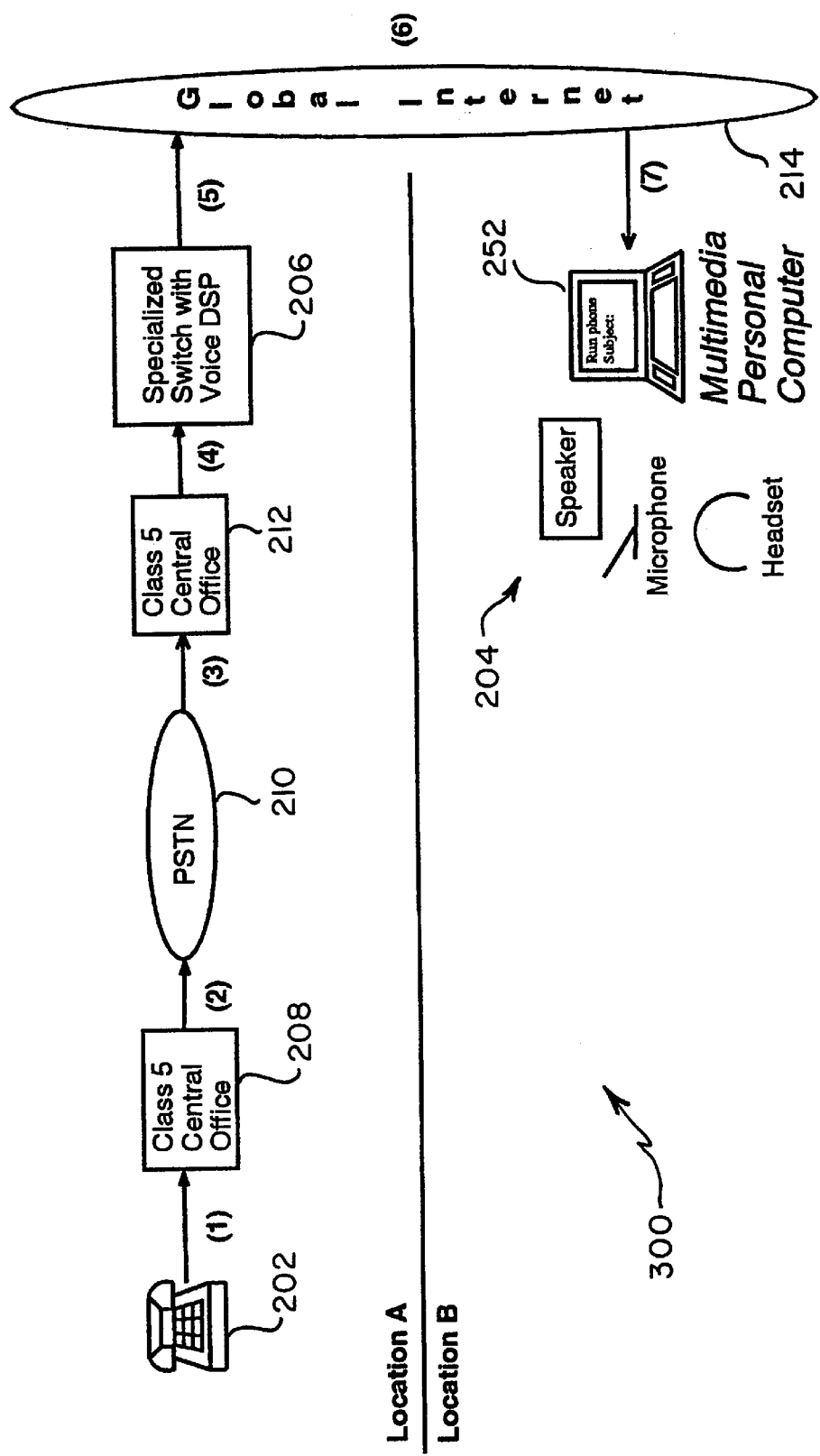
FIG. 4 is a block diagram of an alternative embodiment of the computer network telephone transmission system according to the present invention illustrating telephone to computer communication.

A further alternative embodiment according to the present invention shown as 300 in FIG. 4 allows for computer to telephone communication via Internet 214. In this situation, the telephone number of called party 204 corresponds to the telephone number associated with computer 252. In this situation, specialized computer ITS node 206 must know that the called party is a computer so that it does not direct the Internet call to an Internet access port in the vicinity of computer 252.

Figure 5:
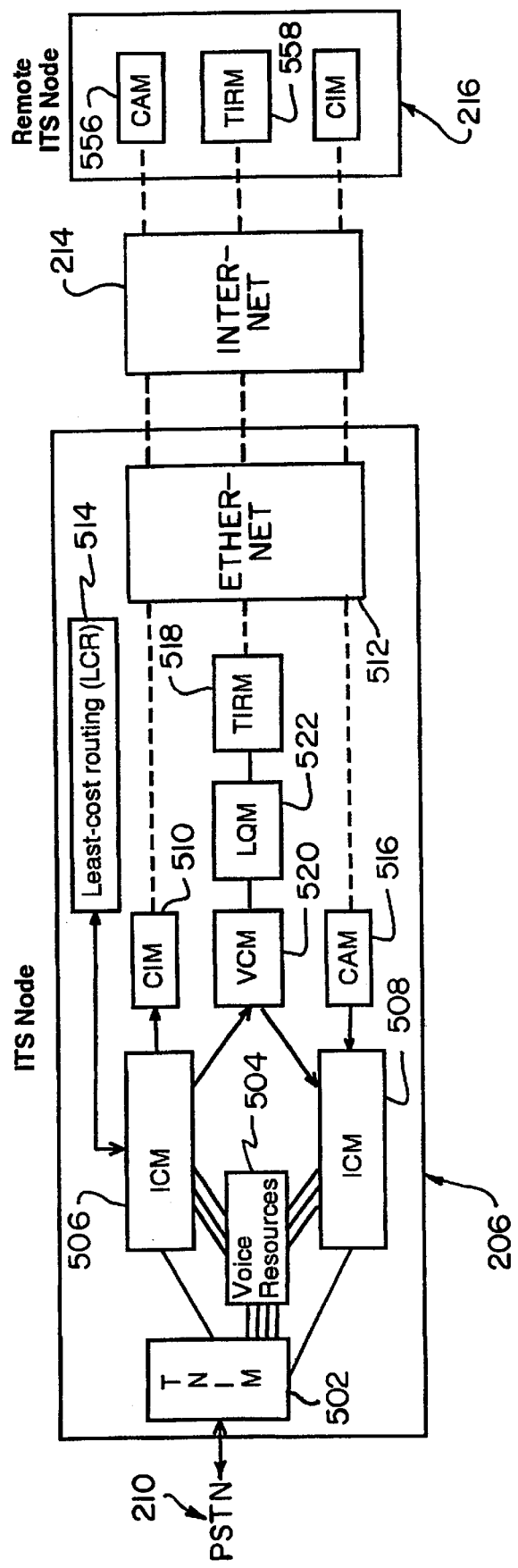
FIG. 5 is a block diagram of a specialized computer system (ITS node) according to the present invention which interfaces the PSTN to a computer network.

Referring now to FIG. 5, therein is shown a block diagram of the specialized computer ITS node 206 at the Internet access port, also referred to as the Internet telephony switch (ITS) which is used for placing a call. Also shown is terminating specialized computer ITS node 216, also referred to as the Remote ITS Node used for receiving a call. ITS Node 206 interfaces to the PSTN 210 using Telephone Network Interface Module (TNIM) 502. TNIM 502 receives calls from the PSTN 210 and answers those calls under the control of Internet Call Manager or ICM 506. The calls received from PSTN 210 are actually outgoing calls that are to be routed through the Internet. The calls received from PSTN 210 are routed to an ICM 506 (discussed in more detail below) for routing over the Internet. When ITS Node 206 serves as a terminating specialized computer ITS node, TNIM 502 is used to place outbound calls on PSTN 210 in order to service incoming calls received over the Internet. TNIM 502 may be implemented using a Dialogic Digital Telephony Interface DTI/211 T-1 Network Interface Board available from Dialogic Corporation of Parsippany, N.J., running the appropriate software to carry out the described functions. The Dialogic DTI/211 is described in Dialogic Products and Services Guide 12.20, the contents of which are incorporated herein by reference. The DTI/211 interfaces through a T1 connection (a DTI/212 may be used with an E1 connection) to a digital switch in a central office. Alternatively, an analog version of the DTI-211, i.e., the LSI120, may be used to interface to analog telephone lines. The DTI-211 provides the appropriate signalling required to communicate with the PSTN, e.g., G.711 signalling.

Within ITS Node 206, TNIM 502 is connected to a Voice Resources module 504. Voice Resources module 504 provides voice call processing, including DTMF (dual tone multifrequency) detection and generation, as well as coding of voice signals using either A-law or µ-law pulse coded modulation (PCM) into 64 Kbit/s data streams. The 64 Kbit/s data rate may be varied down to 24 Kbit/s using data compression. Voice Resources module 504 may be implemented using a Dialogic D/121B 12-Port Voice Processing Board available from Dialogic Corporation of Parsippany, N.J., running the appropriate software to carry out the described functions. The Dialogic D/121B is described in Dialogic Products and Services Guide 11.42, the contents of which are incorporated herein by reference. The D/121B provides the capability to store the digitized voice data received from the PSTN and to play it back out to the computer network. The D/121B includes programmable DSP units for storing and playing the digitized voice data. The D/121B also provides tone detection and generation used in telephone communication.

The D/121B is not provided with any specific telephone functionality per se. Rather, the D/121B communicates with the DTI/211 over a bus, such as the Dialogic SCbus (Signal Computing Bus). The SCbus allows voice data coming in from the PSTN, or to be transmitted out onto the PSTN, to pass from the D/121B to the DTI/211. Additionally, the SCbus may provide the functionality of a switch matrix in order to connect an inbound call from the PSTN directly to an outbound call to the PSTN in the event that it is more efficient to place the call entirely through the PSTN rather than through the computer network.

Voice Resources module 504 interfaces to two separate Internet Call Managers (ICM) 506 and 508. Internet Call Manager 506 is used to process outgoing calls, i.e., those calls received from PSTN 210 and which are to be routed via the Internet to a called party. Conversely, Internet Call Manager 508 is used to process incoming calls from the Internet, i.e., those calls which originated at a remote site and were routed through the Internet and are to be connected to a called party by way of TNIM502 and PSTN 210. An ICM may be implemented in hardware, software or a combination of both. In either event, the ICM function needs to be performed for each call which is being processed. If the ICM is being implemented in software, then an instance of the ICM must be created for each call. Alternatively, the ICM may be capable of handling multiple time slots and thus capable of simultaneously handling multiple calls. Similarly, if the ICM is being implemented in hardware, then a sufficient number of ICM modules should be provided to handle a desired volume of call traffic based on statistical usage. The ICM utilizes the digital signal processing (DSP) of the Voice Resources module to sample the incoming voice data stream and convert it to messages or packets which are then transmitted over the Internet. Each of ICMs 506 and 508 is directly connected to TNIM 502 for communicating call signalling information. The actual voice data is communicated between TNIM 502 and Voice Resources module 504 and then between Voice Resources module 504 and ICM 506 or 508.

Internet Call Manager 506 accepts calls from TNIM 502 and prompts the calling party for the telephone number of the called party it is desired to reach. Internet Call Manager 506 then passes this information to Connection Initiation Module (CIM) 510, which in turn establishes a data connection over Internet 214 and negotiates the various call setup and establishment parameters. Once the Internet data call is established by CIM 510, the data stream for the voice call is passed through an appropriate Ethernet interface 512 for transmission to Internet 214.

In order to establish the call, CIM 510 communicates with a Call Acceptance Module (CAM) 556 associated with the Remote ITS Node at the receiving end. During this call negotiation and set up phase, CIM 510 and CAM 556 exchange parameters such as the destination telephone number to be dialed, and whether or not the packetized voice data stream is to be filtered through the Voice Compander Module (discussed below) and/or the Line Quality Module (discussed below) before being transmitted over Internet 214. In addition, the particular protocol used for the data transmission between ITS Node 206 and ITS Node 216 is established. The data transmission protocol is typically either TCP/IP or UDP/IP, since these are the primary protocols supported by Internet 214. Once the initial call setup parameters have been exchanged between ITS Nodes 206 and 216, ICM 506 waits for an indication from Remote ITS Node 216 that the destination telephone number has been dialed by Remote ITS Node 216.

Before establishing an Internet voice connection, ITS Node 206 utilizes Least Cost Routing (LCR) module 514 in order to locate the ITS Node that can route the call at the receiving end in the most cost efficient manner. To perform this function, LCR 514 first matches the characteristics of the destination telephone number (called party telephone number) with data stored in a local database. This may be carried out using a hierarchical search to locate the ITS node in the region of the dialed telephone number. Thus, long distance numbers are detected by parsing out an initial "1" in the dialed number (similarly, a "011" would indicate an international call). Next, the area code is parsed to determine the geographical region. Continuing, the exchange numbers are parsed to determine the specific geographical region and the ITS node serving that region. In addition to or in place of the hierarchical search or matching, LCR 514 may include lists of specific telephone numbers and their associated ITS nodes. While this may be less efficient in general, it may be more efficient in specific situations, such as frequently dialed telephone numbers. After searching the database, LCR 514 indicates the optimal location of the receiving ITS Node for processing the particular call. Additionally, the above database may also include alternate ITS node information so that LCR 514 may also provide CIM 514 with the next most optimal ITS Node, and so on, so that if the optimal ITS Node is unavailable or cannot handle the call, CIM 510 can then attempt to place the call using the next most optimal receiving ITS Node.

Additionally, LCR 514 determines whether the destination telephone number may be dialed more efficiently (based on the cost of the call, node availability and other system parameters) through the PSTN. If the call can be placed more efficiently through the PSTN, LCR 514 indicates this to ICM 506, which then dials the destination telephone number using PSTN 210 by way of TNIM 502. The inbound PSTN call and the outbound PSTN call are then bridged together in a crosspoint switch matrix in the TNIM 502. This situation may occur where both the calling and called parties are in the vicinity of the same ITS Node.

A full duplex voice path is established between ITS Node 206 and Remote ITS ode 216 over Internet 214 using Telephony Internet Router Module (IRM) 518 located at ITS Node 206. When TIRM 518 is used in ITS Node 206 to place a call (as contrasted with receiving a call in Remote ITS Node 216), TIRM 518 functions to capture and route the packetized voice data to a corresponding TIRM 558 located at Remote ITS Node 216. Similarly, when a TIRM is used to receive calls, e.g., TIRM 558 located at Remote ITS Node 216, it functions to receive the packetized voice data and direct it to an ICM to service the call. The ICM in turn sends the digital voice data to the TNIM. In turn, the TNIM converts the digital voice data into an analog audio signal to be transmitted by the PSTN to the called party. Alternatively, the digital data may be provided directly from the TNIM to the PSTN without conversion to analog in the event that the particular PSTN is capable of handling digital data.

Voice data continues to be exchanged between the two ITS Nodes 206 and 216 until either the calling or called party terminates the call. When a call is terminated, a supervisory signal is received by the TNIM and passed to the ICM at the ITS Node where the call termination was initiated. The ICM at the terminating location notifies the TIRM at the terminating location to "tear down" or disconnect the call connection. In order to "tear down" the connection, the TIRM at the terminating location (ITS Node) notifies the counterpart TIRM at the other ITS Node. The ICM at each location then frees up the voice processing DSP associated with the call, so that the DSP resources may be used for subsequent calls.

Additional voice call processing elements may be incorporated into each ITS Node in order to enhance the overall performance of the ITS Node. Specifically, a Voice Compander Module (VCM) 520 may be added to provide data compression and expansion functionality. Data compression is performed on the transmitted data stream in order to reduce the bandwidth required for transmission of the digitized voice data over the Internet. Similarly, when the received data stream over the Internet has been compressed, it must first be expanded before further processing.

Additionally, a Line Quality Monitor (LQM) 522 may be included in order to monitor line quality characteristics, such as echo and noise, and then to perform necessary filtering functions to reduce or eliminate such deleterious effects. Further, a Call Security Module may be included to encrypt the conversation in order to prevent electronic eavesdropping over the Internet.

When receiving a call, an ITS Node waits for another ITS Node to contact it using its TIRM and ICM and to request that a telephone call be initiated on behalf of a calling party who has dialed into the other ITS Node. Reception of the Internet voice call at Remote ITS Node 216 will now be described in detail using the receiver portion of ITS Node 206. In an actual system, the receiving portion of ITS Node 216 would process a voice call received from the Internet.

A telephone call is initiated when the CIM of a Remote ITS Node sends a connection request to the CAM of the local ITS Node. When receiving a call from the Internet 214 via Ethernet interface 512, the data stream associated with the particular call is first received by Connection Acceptance Module (CAM) 516. Connection Acceptance Module 516 receives the call setup parameters associated with the particular call and passes the call on to Internet Call Manager 508, which performs the reverse operation of Internet Call Manager 506. Specifically, Internet Call Manager 508 receives the destination telephone number and places a call to the destination telephone number using the TNIM 502 and PSTN 210. ICM 508 then transmits an acknowledgement or "call dialed" indication to the Remote ITS Node ICM.

Each ITS Node may be implemented using a Hewlett Packard HP 9000/743 Telepace platform. The Telepace platform acts as the central processor for coordinating the tasks carried out by the individual modules, e.g., TNIM and ICM. All of the hardware components of the ITS Node are interconnected by a signalling bus which enables call and voice resource routing as required. The particular bus used may be, for example, the Dialogic SCbus. Alternatively, a standard computer platform may be used to implement an ITS Node, both for single user and multiple call applications, depending on the particular hardware capabilities of the computer. In this situation, the Dialogic hardware may be used in a personal computer (instead of the HP Telepace platform) to provide multiple user service. This latter approach may be less efficient than using the HP Telepace platform; however, it may be more cost effective depending on the particular application. In yet another alternative configuration, an ITS node may be implemented using a computer equipped with a sound card capable of simultaneously sampling and playing speech, i.e., processing speech signals in both transmit and receive directions, as well as having a connection to the Internet. Alternatively, an ITS node may be implemented using a computer equipped with the appropriate DSP processing, e.g., in the form of a DSP chip, capable of performing the ITS functions discussed herein. In the computer implementations, a headset or microphone/speaker combination may be used for the user audio interface.

Voice resources module 504 (FIG. 5) receives digitized voice data from the ICM and routes this data to the TNIM over the bus connecting these two modules, such as the Dialogic SCbus. This data is then transmitted by the TNIM out onto the PSTN using standard T1/E1 signalling. This is data which has been received from the remote ITS node. Similarly, the Voice resources module 504 receives digitized voice data originating from the PSTN by way of the TNIM. This data is then passed to the ICM for transmission over the computer network. The Voice resources module 504 also performs the necessary tone generation and detection, such as DTMF tones, used to dial the digits of a telephone number.

TNIM 502 monitors the time slots used for the various telephone lines. Each line is monitored for a number of events, including, a hang up by the calling or called party and inbound call notifications from the central office. The TNIM notifies the ICM upon the occurrence of any of these events. Also, the TNIM processes requests from the ICM, such as, taking a timeslot off hook to dial an outgoing call and releasing an inbound or outbound call in the event of a hang up.

Voice compander module 520 provides data compression for the incoming data received from the PSTN before it is transmitted over the computer network. Since the resources of a computer network are limited, these resources may be overwhelmed during periods of high volume traffic. Potentially, data throughput may be decreased to the point where there is a noticeable delay between transmission and reception. Such a situation is extremely undesirable for real-time telephone communication. Data compression is used to reduce the overall amount of data being transmitted over the computer network, in order to reduce the data delay problems. Of course, the data transmission should not be applied to the point where it greatly affects the audio quality of the data being transmitted. When receiving compressed data which has been transmitted over the computer network, VCM 520 performs the inverse function of expanding the compressed data. The compression used in VCM 520 typically involves 8-bit µ law PCM (Pulse Coded Modulation) having variable compression ratios. The types of compression used may be GSM (Global System for Mobile Communication), CELP (Code Excited Linear Prediction) or ADPCM (Adaptive Differential Pulse Code Modulation). While this is not an exhaustive list, any similar compression technique may be used, such as, for example, any of the compression techniques used by the Netscape Navigator software available from Netscape Communications Corporation of Mountain View, Calif. As the compression ratio increases, the voice quality typically decreases.

Line Quality Monitor or LQM 522 examines the sampled voice data and applies a number of different techniques to improve the voice quality. For example, an echo cancellation filter may be used to minimize the echo effects inherent in long distance telephone calls. Additionally, variable attenuation may be applied to the voice data signal to prevent echo. Because this technique only needs to be applied to the voice data one time between the two endpoints, either the calling party node or the called party node may modify the signal. If the calling party modifies the signal, then the LQM at the receiving node is notified to take no further action. Otherwise, the default situation is to have the receiving node perform the echo cancellation.

Figure 6A:
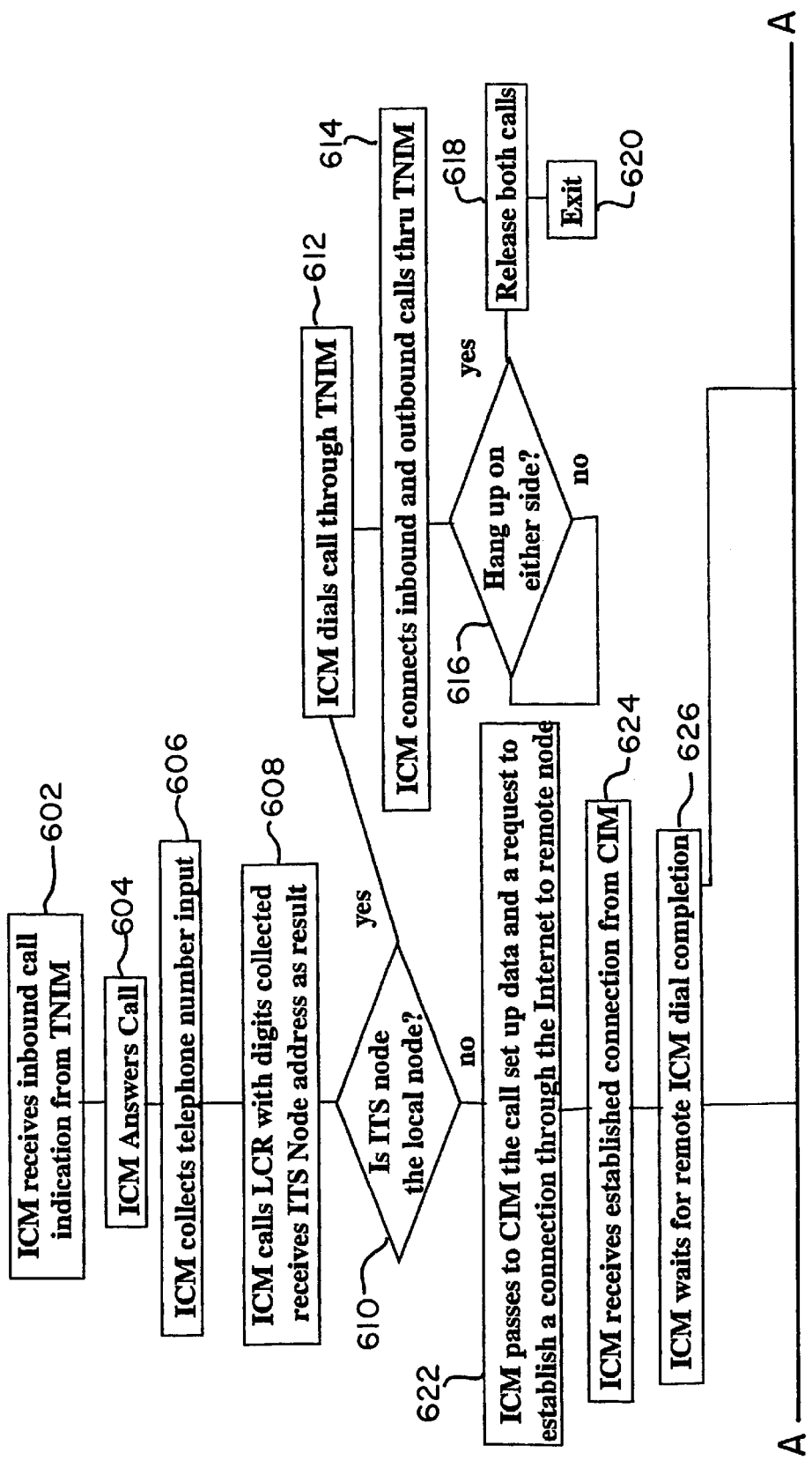
FIG. 6 is a flowchart illustrating the inbound call operation of the specialized computer system (ITS node) of FIG. 5.
Figure 6B:
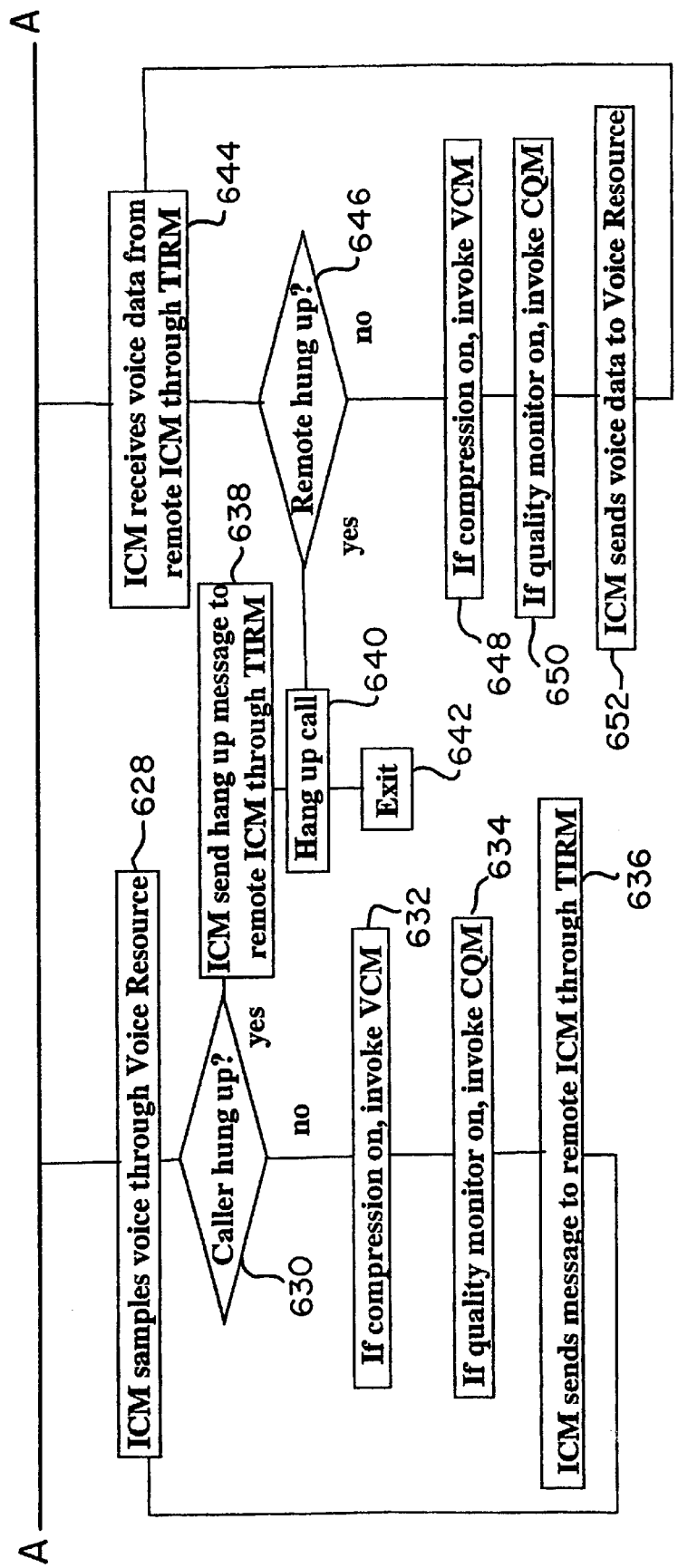

The logical flow of a call through an ITS Node from the calling party's perspective will now be described with reference to FIG. 6. A call is first initiated when the calling party dials. a telephone number which connects him directly to an ITS Node via the PSTN. Referring now to FIG. 6, the ICM receives an inbound call indication from the TNIM at step 602. This indicates that the calling party has initiated a telephone call. At step 604, the ICM instructs the TNIM to answer the call. At step 606 the ICM (through the TNIM) receives information from the PSTN relating to the calling and called parties. Specifically, the PSTN provides Dialed Number Identification Service (DNIS) digits specifying the destination or called party telephone number, as well as Automatic Number Identification (ANI) digits identifying the calling party. The DNIS and ANI are provided to the ICM, which in turn provides this information to the Least Cost Routing or LCR Module at step 608. Based on the DNIS and/or ANI, the LCR specifies to the ICM the ITS node that can most efficiently complete the call to the destination telephone number.

At step 610, if the local ITS Node, i.e., the ITS Node associated with the calling party, is determined to be the most efficient node for routing the call, then the call is dialed back out on the PSTN using the TNIM, by branching out under the "yes" condition to step 612. At step 614, the ICM instructs the TNIM to connect the inbound call from the calling party with the outbound call placed by the local ITS Node. In this manner, a communication channel is established between the calling and called parties. This call remains active as long as neither party has terminated the call. If a call termination is detected at either calling or called party locations at step 616, then the call is broken at step 618 and the calling and called parties are released at step 620.

Alternatively, if a remote ITS Node, i.e, not the local ITS Node, is specified by the LCR as being the most efficient node for routing the call, then this optimal call path is established using the Internet. This is shown as the "no" branch at step 610. At step 622, the ICM at the local ITS Node passes the call setup data and requests the local CIM to connect through the Internet to the CAM at the remote ITS node in order to establish a connection through the Internet to a counterpart ICM at the Remote ITS Node. Step 622 involves first identifying the Internet address of the Remote ITS Node, and then transmitting an initial message in order to establish a communications path between the ICM of the local ITS Node and the ICM at the Remote ITS Node. For example, if a call is being placed from New York City to a number in the United Kingdom, the Internet address of the node in the UK is used to establish a connection to that node. If there is more than one node in the UK, the LCR module determines the most optimally located node based on the destination telephone number. This node location is returned by the LCR module, as well as optionally, additional nodes in decreasing order of preference based on efficiency or other criteria.

As stated above, the call setup parameters used to establish the call include the destination telephone number and whether or not the voice data is to be passed through the Voice Compander Module and/or the Call Quality Module before being transmitted over the Internet. The specific protocol which is used to communicate the actual voice data between the two ITS nodes is configured at installation, and is either TCP/IP or UDP/IP. Once the connection between the local CIM and the remote CAM has been established, the local CIM indicates this to the local ICM at step 624. After the initial parameters have been established between the two ITS nodes, the local ICM waits for the remote ICM to dial the destination telephone number and return an indication to the local ICM that the destination telephone number has been dialed. This occurs at step 626.

At step 628, both the local ICM and remote ICM begin to simultaneously capture voice data from their respective PSTN through their respective Voice Resources Modules. While in this mode, the ITS node tests at step 630 to determine whether either of the calling and/or called parties have terminated the call. If a call termination is not detected, the system executes step 632 and performs compression if data compression has been turned on. Similarly, the system proceeds to execute step 634 and perform line quality monitoring and correction if that feature is also turned on. The ICM then proceeds at step 636 to segment the voice data into messages or packets which are then transferred over the Internet to the remote ICM through the local TIRM. The system then loops back to step 628 to continue the procedure discussed above. In this manner, voice data continues to be transmitted to the remote end. Similarly, voice data is also being received from the remote end, as will be discussed in detail below, such that voice data is being communicated in full duplex mode, i.e., both transmit and receive directions.

If a call termination or hang up is detected at step 630, the "yes" branch from step 630 is followed to step 638, where a call supervision signal from the PSTN where the call termination occurred is first received by the ICM at the terminating location and then transmitted by the TIRM at the terminating location to the ICM at the other location. System execution then proceeds to step 640 where the necessary procedures are carried out to hang up or "tear down" the call. Finally, the system exits at step 642 and essentially frees up the resources that were associated with the particular call so that they are available to process another call.

Steps 628 through 636 of FIG. 6 represent the data transmission portion of a full duplex telephone call. Reception of data from the remote location begins at step 644, which is executed right after step 626, i.e., after the remote ICM has indicated that the destination telephone number has been successfully dialed. Execution of step 644 and the subsequent steps associated with data reception are performed in parallel with the data transmission function, i.e., steps 628–636. After the local ICM receives each data packet from the remote ICM through the TIRM at step 644, the system tests at step 646 to determine if the call has been terminated by the remote party hanging up. If a call termination is detected, system execution proceeds along the "yes" branch of step 646 to steps 640 and 642 and the appropriate hang up and exit procedures are performed, as indicated above.

If a call termination is not detected at step 646, the system executes step 648 and performs decompression if data compression has been turned on at the remote end. Similarly, the system proceeds to execute step 650 and perform line quality monitoring and correction if that feature is also turned on. Finally, the processed voice data packet is sent by the local ICM through the Voice Resources Module to the TNIM at step 652 so that it may then be delivered by way of the PSTN to the user. System operation then loops back to step 644 in order to receive and process a subsequent voice data packet.

Figure 7:
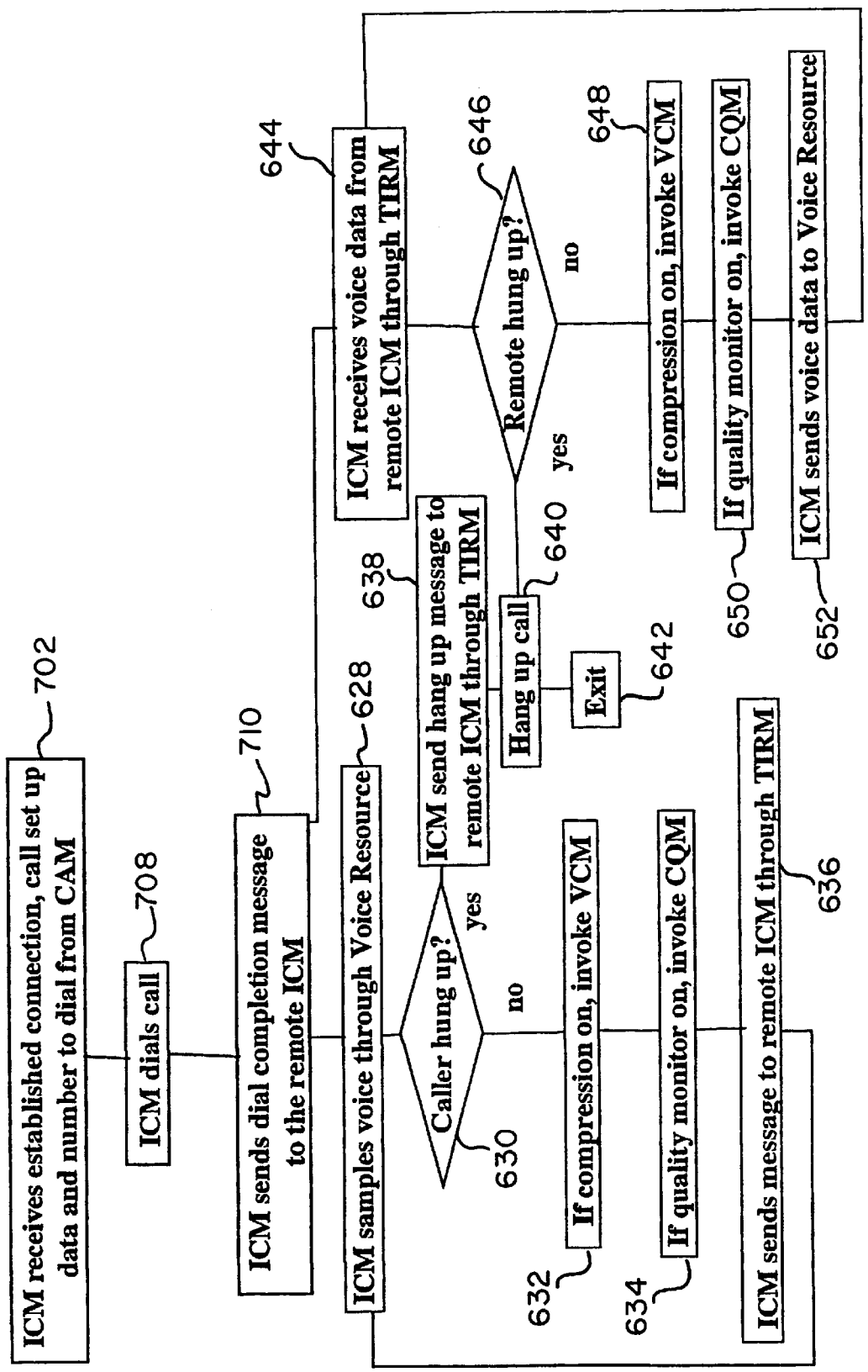
FIG. 7 is a flowchart illustrating the outbound call operation of the specialized computer system (ITS node) of FIG. 5.

The logical flow of a call through a local ITS Node located at a called party location, i.e., from the called party perspective, will now be described with reference to FIG. 7. As shown in FIG. 7, the ICM at step 702 receives an indication that a call has been established through the Internet. It also receives the call setup data and telephone number of the called party and proceeds to dial that number through the CAM at step 708. Once the call to the destination telephone number has been completed, the local ICM transmits a dial completion message at step 710 to the remote ICM.

At this point, the communications link between the calling and called parties has been established, and the local and Remote ITS Nodes proceed to exchange voice data packets. This is shown in the remaining portion of FIG. 7, which is identical to the data exchange portion of FIG. 6 discussed above. The steps shown in FIG. 7 that correspond to those steps discussed above in connection with FIG. 6 have been given the same designation numerals. Accordingly, the description of these steps in FIG. 7 need not be repeated here, since they correspond to the same steps carried out in FIG. 6.

Figure 8:
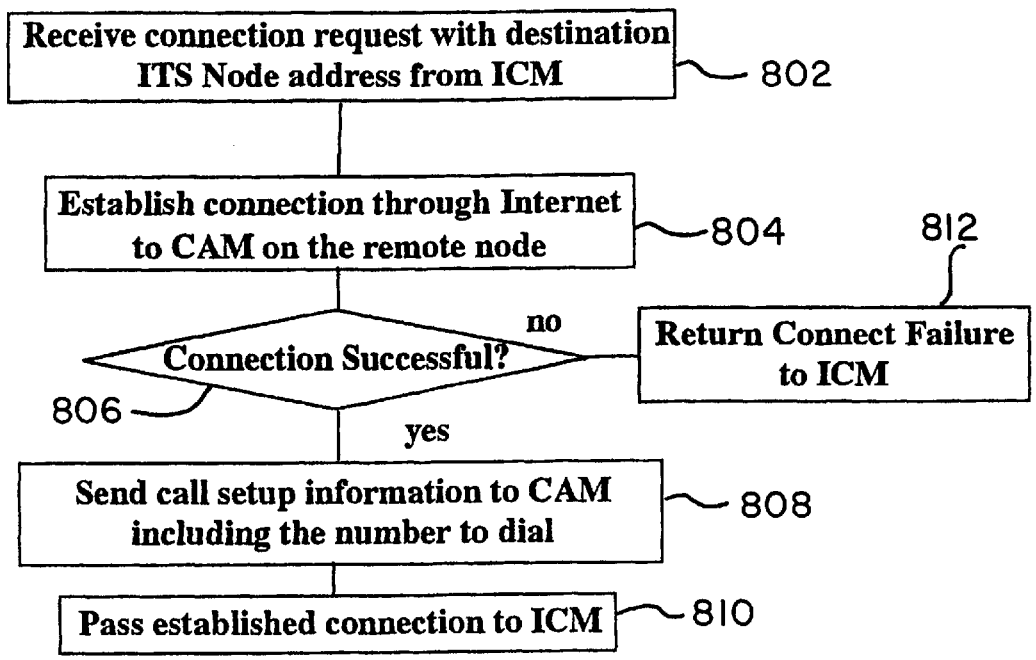
FIG. 8 is a flowchart illustrating the operation of the Call Initiation Module (CIM)

The detailed operation of the individual blocks of FIG. 5 will now be explained with reference to FIGS. 8 to 10. Referring now to FIG. 8, therein is shown a flowchart of the operation of the CIM module. At step 802, the CIM module receives a connection request from the ICM. This connection request includes the destination address of the remote ITS Node. At step 804, the CIM proceeds to establish an Internet connection through the Internet to the CAM located at the remote ITS Node. At step 806, the CIM tests to see if the connection was successful. If the connection was successfully established, then the CIM transmits to the CAM a call initiation message indicating that a new call needs to be serviced. The call initiation message includes information such as any special configuration information indicating the communications protocol to be used, whether compression has been turned on, and if so, what type, whether echo cancellation has been turned on, and any other information needed to properly service the call. The call initiation message also includes the destination telephone number of the called party. At step 810, the CIM informs the ICM that a connection has been successfully established with the CAM at the remote ITS Node. The ICM then waits for an indication that the destination number has been successfully dialed by the remote ICM. If at step 806 a successful connection was not completed, the CIM proceeds at step 812 to notify the ICM of the failure to successfully connect to the remote ITS Node.

Figure 9:
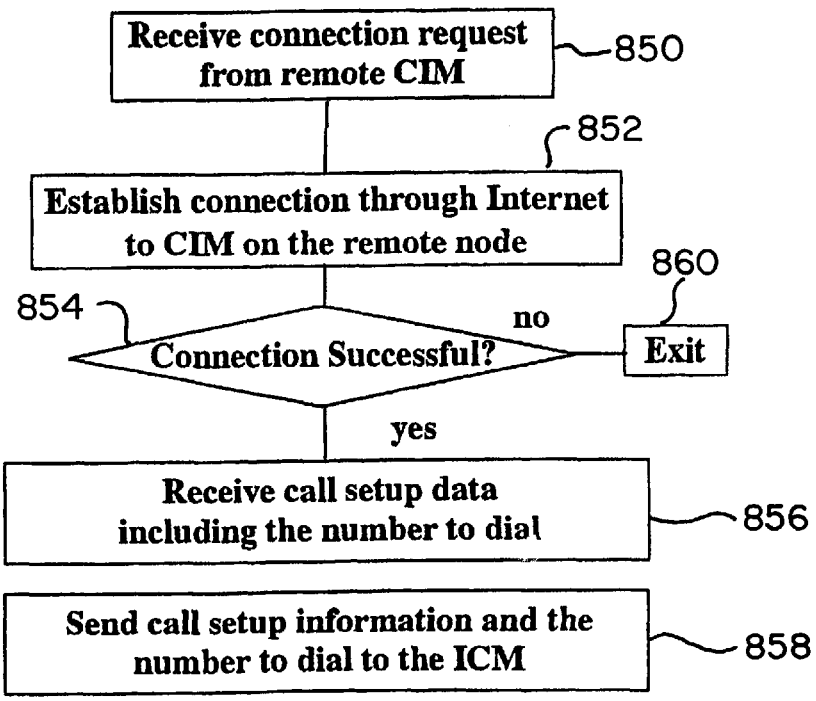
FIG. 9 is a flowchart illustrating the operation of the Call Acceptance Module (CAM)

Referring now to FIG. 9, therein is shown a flowchart of the operation of the CAM module. At step 850, the CAM module waits for and receives a connection request from a CIM module located at a remote ITS node. At step 852, the CAM proceeds to establish a connection through the Internet to the CIM located at the remote ITS node. The CAM determines at step 854 whether a successful connection has been established. If the connection has been successfully established, the CAM proceeds at step 856 to receive the call setup data from the CIM at the remote ITS node. As indicated above, this call setup data includes such information as the destination telephone number of the called party. The received call setup information and destination telephone number are then transmitted by the CAM to the ICM, which in turn instructs the TNIM to out dial the destination telephone number.

Figure 10:
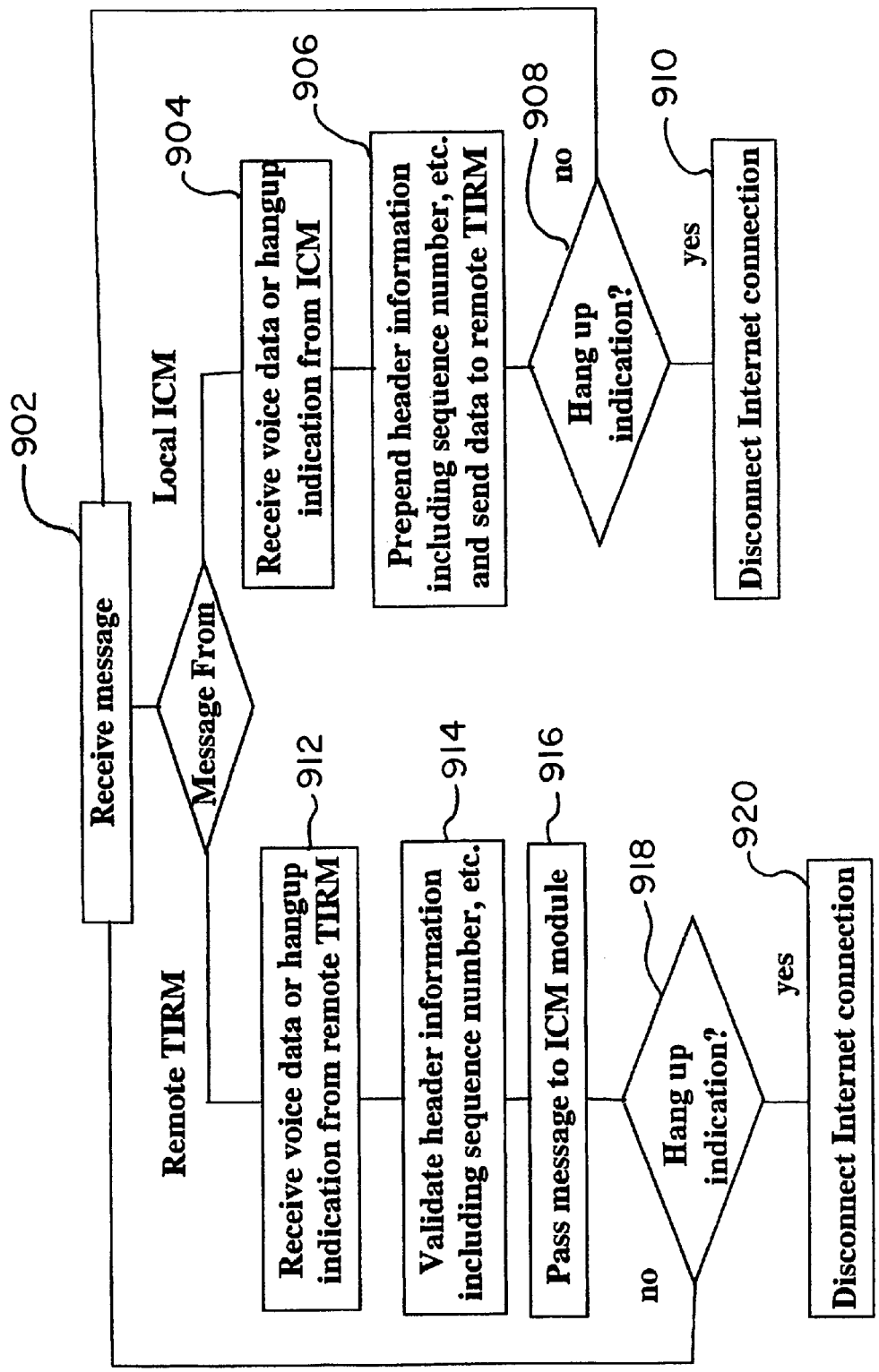
FIG. 10 is a flowchart illustrating the operation of the Telephony Internet Router Module (TIRM).

Referring now to FIG. 10, therein is shown a flowchart of the operation of the TIRM module. At step 902, the TIRM receives messages which have come either from the ICM located locally at the same node or via the Internet from a counterpart TIRM module located at the remote ITS node. If the message has come from the local ICM, the TIRM receives this message at step 904. The message from the local ICM may include voice data. Alternatively, the message may include other information such as the destination telephone number, caller hangup information, etc. At step 906, the TIRM packetizes this message into data packets of appropriate length and format and prepends a message header which may include message size, data type (voice, telephone number, etc.) or message sequence number. The packet or message is then sent to the remote ITS node over the established Internet connection. The TIRM then proceeds at step 908 to determine if a hangup indication has been received. If a hangup indication has not been received, i.e., the current call is still active and additional data needs to be transmitted, the TIRM loops back to step 902 to receive further messages. If there is a hangup indication at step 908, TIRM breaks the Internet connection at step 910.

Alternatively, if the message received at step 902 is from the remote TIRM, the local TIRM proceeds to step 912 to receive voice data or hangup information from the remote TIRM. The header information, including sequence number, are validated at step 914. Validation of the sequence number insures that the messages have arrived in the proper order. Received messages, such as voice data, are handed off to the ICM at step 916. The TIRM then proceeds at step 918 to determine if a hangup indication has been received. If a hangup indication has not been received, i.e., the current call is still active and additional data needs to be transmitted, the TIRM loops back to step 902 to receive further messages. If a hangup indication is received at step 918, the Internet connection is terminated at step 920. Processing of steps 904–910 is carried out in parallel with the processing of steps 912–920 since messages are being received simultaneously from the local ICM as well as from the remote TIRM.

While the invention has been particularly shown and described with reference to a preferred embodiment thereof, it will be understood by those skilled in the art that various changes in form and details may be made therein without departing from the spirit and scope of the invention.

What is claimed is:

1. A method of routing a full duplex telephone call between a first telephone set and a second telephone set using a public computer network as at least part of a communication link connecting said first and second telephone sets, comprising the steps of:

receiving at a first computer network access port a first telephone call from a central office placed from said fist telephone set initiating said full duplex telephone call, said first telephone call specifying a telephone number of said second telephone set, without specifying additional telephone destinations;

converting data received from the central office to an Intenet protocol;

establishing a communication link over said public computer network between said first computer network access port and a remote second computer network access port;

placing a second telephone call from said second computer network access port to said second telephone set using a PSTN;

converting data received from the public computer network from Intenet protocol to a PSTN protocol; and connecting said first telephone call, said communication link and said second telephone call to thereby establish a telephone call between said first telephone set and said second telephone set.

2. The method of claim 1 further comprising the step of:
receiving said first telephone call from a public switched telephone network.

3. The method of claim 2 further comprising the step of:
placing said second telephone call using said public switched telephone network.

4. The method of claim 1 further comprising the step of:
placing said second telephone call using a public switched telephone network.

5. The method of claim 1, wherein said first telephone call is the only call which is required to be placed by said first telephone set to effect communication with said second telephone set.

6. The method of claim 2 wherein said computer network is at least a portion of an Internet computer network.

7. The method of claim 6 wherein said first and second computer network access ports are first and second telephone switches and further comprising the steps of:

using a telephone network interface device to receive said first telephone call;

using a computer network call manager device to answer said first telephone call;

routing said first telephone call from said telephone network interface device to a voice resources module for processing and then routing said first telephone call to said computer network call manager device;

using a call initiation module to establish a connection through said computer network to said second computer network telephone switch;

transmitting call setup information from said call initiation module to said second computer network telephone switch; and transmitting information contained in said first telephone call from said computer network call manager device to said second computer network telephone switch.

8. The method of claim 7 further comprising the step of:
determining the least cost routing procedure for routing said first telephone call from said first computer network telephone switch to said second telephone set.

9. The method of claim 8 further comprising the step of:
routing said first telephone call from said first computer network telephone switch to said second telephone set using said public switched telephone network based on the least cost routing procedure.

10. The method of claim 8 wherein the determining step comprises the further step of:

performing a hierarchical search based on information indicative of said second telephone set.

11. The method of claim 7 further comprising the step of:
performing at least one of data compression, echo cancellation and noise filtering on the information contained in said first telephone call.

12. The method of claim 7 further comprising the steps of:
receiving, at a call acceptance module, information contained in said second telephone call from said second computer network telephone switch;
routing said information contained in said second telephone call to said computer network call manager and then to said voice resources module for processing; and
routing said information contained in said second telephone call from said voice resources module to said telephone network interface device for transmission to said first telephone set as part of said first telephone call.

13. A system for routing a full duplex telephone call between a first telephone set and a second telephone set using a public computer network as at least part of a communication link connecting said first and second telephone sets, comprising:
a first computer network access port which receives a first telephone call from a central office placed from said first telephone set initiating said full duplex telephone call, said first telephone call specifying a telephone number of said second telephone set, without specifying additional telephone destinations;
a first protocol conversion module converting data received from the central office to an Intenet protocol;
a communication link over a public computer network between said first computer network access port and a second computer network access port;
a calling circuit which places a second telephone call from said second computer network access port to said second telephone set using a PSTN;
a second protocol conversion module converting data received from the public computer network from Internet protocol to a PSTN protocol; and
a call management circuit which connects said first telephone call, said communication link and said second telephone call to thereby establish a telephone call between said fist telephone set and said second telephone set.

14. The system of claim 13 further comprising:
a public switched telephone network interface circuit which receives said first telephone call through said public switched telephone network.

15. The system of claim 14 further comprising:
a second public switched telephone network interface circuit which places said second telephone call through said public switched telephone network.

16. The system of claim 13 wherein said public switched telephone network interface circuit places said second telephone call through said public switched telephone network.

17. The system of claim 13, wherein said first telephone call is the only call which is required to be placed by said first telephone set to effect communication with said second telephone set.

18. The system of claim 14 wherein said computer network comprises an Internet computer network connection.

19. The system of claim 18 wherein said first and second access ports are first and second telephone switches further comprising:
a telephone network interface device which receives said first telephone call;
a computer network call manager device which answers said first telephone call;
said computer network call manager device routing said first telephone call from said telephone network interface device to a voice resources module for processing and routing said first telephone call to said computer network call manager device;
a call initiation module which establishes a connection through said computer network to said second computer network telephone switch;
a call setup information circuit which transmits call setup information from said call initiation module to said second computer network telephone switch; and
said computer network call manager device transmitting information contained in said first telephone call from said computer network call manager device to said second computer network telephone switch.

20. The system of claim 19 further comprising:
a least cost routing system for determining a least cost routing procedure for routing said first telephone call from said first computer network telephone switch to said second telephone set.

21. The system of claim 20 wherein said computer network call manager device routes said first telephone call from said first computer network telephone switch to said second telephone set using said public switched telephone network based on the least cost routing procedure.

22. The system of claim 20 wherein the least cost routing system comprises a hierarchical search system which searches based on information indicative of said second telephone set.

23. The system of claim 19 further comprising:
at least one of a data compression circuit, an echo cancellation circuit and a noise filter which operates on the information contained in said first telephone call.

24. The system of claim 19 further comprising:
a call acceptance module which receives information contained in said second telephone call from said second computer network telephone switch;
said computer network call manager device routing said information contained in said second telephone call to said voice resources module for processing and then to said telephone network interface device for transmission to said first telephone set as part of said first telephone call.

* * * * *

(12) EX PARTE REEXAMINATION CERTIFICATE (8303rd)
United States Patent
Turock

(10) Number: US 6,243,373 C1
(45) Certificate Issued: Jun. 7, 2011

(54) METHOD AND APPARATUS FOR IMPLEMENTING A COMPUTER NETWORK/INTERNET TELEPHONE SYSTEM

(75) Inventor: David L. Turock, Westfield, NJ (US)

(73) Assignee: C2 Communications Technologies, Inc., Toronto, Ontario (CA)

Reexamination Request:
No. 90/010,716, Dec. 7, 2009
No. 90/009,637, Dec. 29, 2009

Reexamination Certificate for:
Patent No.: 6,243,373
Issued: Jun. 5, 2001
Appl. No.: 08/548,323
Filed: Nov. 1, 1995

(51) Int. Cl.
H04Q 3/66 (2006.01)
H04Q 3/64 (2006.01)
H04L 29/06 (2006.01)
H04M 7/00 (2006.01)
H04L 12/66 (2006.01)
H04M 3/42 (2006.01)
H04M 3/22 (2006.01)
H04M 7/12 (2006.01)

(52) U.S. Cl. .............. 370/352; 370/401; 379/88.17
(58) Field of Classification Search .............. None
See application file for complete search history.

(56) References Cited

U.S. PATENT DOCUMENTS

| | | | | |
|---|---|---|---|---|
| 4,567,332 | A | * 1/1986 | Jamison | 379/27.01 |
| 5,530,744 | A | 6/1996 | Charalambous et al. | 379/265 |
| 5,568,475 | A | 10/1996 | Doshi et al. | 370/58.2 |
| 5,726,984 | A | 3/1998 | Kubler et al. | 370/349 |
| 5,917,853 | A | * 6/1999 | Greenblatt | 375/222 |
| 2001/0040885 | A1 | 11/2001 | Jonas et al. | 370/352 |

OTHER PUBLICATIONS

H.M. Heggestad and C. Weinstein, "Voice and Data Communication Experiments on a Wideband Satellite/Terrestrial Internetwork System," IEEE International Conference on Communications, vol. 1, Jun. 19–22, 1983, pp. 1–8.

Massachusetts Institute of Technology Lincoln Laboratory Annual Report to the Defense Communications Agency, Defense Switched Network Technology and Experiments Program, issued Feb. 29, 1984 for the fiscal year Oct. 1, 1982 to Sep. 30, 1983, pp. 15–20.

C. Weinstein, "The Experimental Integrated Switched Network—a System–Level Network Test Facility," 1983 IEEE Military Communications Conference, Nov. 2, 1983, pp. 449–456.

C. Yang, Request for Comment (RFC) 1789, "INETPhone: Telephone Service and Servers on Internet," Apr. 1995.

* cited by examiner

Primary Examiner—Roland G Foster

(57) ABSTRACT

A method and apparatus are provided for communicating audio information over a computer network. A standard telephone connected to the public switched telephone network (PSTN) may be used to communicate with any other PSTN-connected telephone, where a computer network, such as the Internet, is the transmission facility instead of conventional telephone transmission facilities, such as the interexchange or intralata facilities. In addition to telephone-telephone communication, telephone-computer and computer-telephone communication is also possible. The originator of a conversation (calling party) dials the number of an access port for the computer network. The call is routed to a central office switching system which is connected to the PSTN and then to the access port which is a specialized computer system (ITS node). The caller transmits the number of the desired party (the called party) to the specialized computer system (ITS node) which interfaces between the telephone switching system and the computer network. The specialized computer system (ITS node) receives the number of the called party and establishes a two-way, fill duplex communications link via the computer network to a corresponding remote access port or specialized computer system (ITS node) in the vicinity of the called party. This specialized computer system (ITS node) at the receiving end is connected to the local PSTN in the region of the called party, and uses the local PSTN to connect the call to the called party. Once the call is answered at the called party, the calling and called party may communicate as if the call had been established using the conventional telephone system.

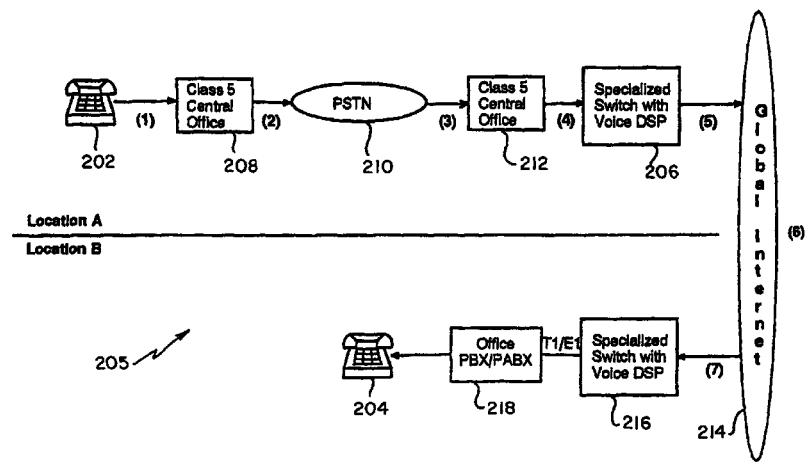

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *